United States Patent
Woo et al.

(10) Patent No.: US 6,733,888 B2
(45) Date of Patent: May 11, 2004

(54) FLOOR-COVERING MATERIAL USING PHENOL COMPOSITE RESIN

(75) Inventors: Je-suk Woo, Bucheon (KR); Chang-guen Lee, Incheon (KR); Hyeong-keor Yoo, Bucheon (KR); Sung-il Kim, Bucheon (KR)

(73) Assignee: Woojin Corporation, Bucheon (KR)

( * ) Notice: Subject to any disclaimer, the term of this patent is extended or adjusted under 35 U.S.C. 154(b) by 24 days.

(21) Appl. No.: 10/262,750

(22) Filed: Oct. 2, 2002

(65) Prior Publication Data

US 2003/0203213 A1 Oct. 30, 2003

(30) Foreign Application Priority Data

Apr. 24, 2002 (KR) ........................................ 2002-22434

(51) Int. Cl.$^7$ .......................... B32B 21/08; B32B 27/40; B32B 27/42
(52) U.S. Cl. ............................. 428/423.3; 428/424.6; 428/425.1; 428/425.3; 428/525; 428/526; 428/528; 428/529
(58) Field of Search ..................... 428/423.3, 424.6, 428/425.1, 425.3, 525, 526, 528, 529

(56) References Cited

U.S. PATENT DOCUMENTS

| | | | | | |
|---|---|---|---|---|---|
| 4,546,039 A | * | 10/1985 | Horacek et al. | ............. | 428/357 |
| 4,608,407 A | * | 8/1986 | Kerimis et al. | ................. | 524/14 |
| 4,690,987 A | * | 9/1987 | Sakakibara et al. | ......... | 525/502 |
| 5,308,914 A | * | 5/1994 | Wallon et al. | ............... | 524/591 |

FOREIGN PATENT DOCUMENTS

| | | | |
|---|---|---|---|
| FR | 2 539 077 | * | 7/1984 |
| KR | 189372 | | 1/1999 |

* cited by examiner

*Primary Examiner*—D. Lawrence Tarazano
(74) *Attorney, Agent, or Firm*—Michael J. Striker

(57) ABSTRACT

Disclosed is a floor-covering material, in which a phenol composite resin comprising phenol resin of resorcinol-formaline and polyurethane resin is incorporated with paper and dried, to form a prepreg, which is then thermally compressed to the upper side of a PVC base or a waterproof plywood layer, yielding a transparent protective layer and a shaping layer. In the flooring material, the transparent layer and the shaping layer are made of phenol composite resin, and thus low in heat- and moisture-distortion, with no curling. Further, since a surface layer of the floor-covering material is hardly distorted by heat, a balance layer for the suppression of such distortion is not additionally required.

5 Claims, 1 Drawing Sheet

FLOOR-COVERING MATERIAL USING PHENOL COMPOSITE RESIN

BACKGROUND OF THE INVENTION

1. Field of the Invention

The present invention pertains, in general, to flooring materials using phenol composite resin, and more specifically, to a floor-covering material suitable for use in under-floor heating systems or floors, which has the advantages of little heat-distortion and no curling, with excellent surface hardness.

2. Description of the Prior Art

Typically, a floor sheet material for use in the Korean under-floor heating system, which is registered to Korean Pat. No. 189372, comprises a core layer, a shaping layer and a transparent protective layer successively laminated on a surface of waterproof plywood, and a balance layer attached to the opposite side of the plywood. The core layer is a sheet obtained by incorporating a sheet of paper with phenol resin, and the shaping layer and the surface layer are sheets of paper-incorporated melamine resin. On the bottom side of the waterproof plywood, the balance layer consisting of a sheet of paper-incorporated melamine resin is necessarily laminated to alleviate heat-distortion or curling of the surface layer.

Such conventional flooring materials suffer from the disadvantage of a readily-scratched surface due to low surface hardness. In addition, even though the balance layer is laminated onto the bottom side of the flooring material, distortion or curling of the flooring material cannot be prevented, attributable to the surface layer, which largely expands or contracts by heat.

SUMMARY OF THE INVENTION

Therefore, it is an object of the present invention to alleviate the problems in the prior art and to provide a floor-covering material which is advantageous in light of high surface strength, low heat-distortion, prevention of curling, and unnecessary balance layer on a bottom side of the flooring material, by preparing a prepreg with the use of phenol composite resin, instead of typical phenol resin or melamine resin, and forming a surface layer of the floor-covering material therefrom.

DETAILED DESCRIPTION OF THE INVENTION

The present invention is characterized in that a prepreg consisting of paper incorporated to phenol composite resin is thermally compressed, to give a transparent protective layer 1 and a shaping layer 2, which together constitute a surface layer of the present floor-covering material.

The phenol composite resin used in the present invention is formed by adding 15–25 wt % of polyurethane resin to phenol resin, resulting from reaction of resorcinol and formaline, and has a solid content of 50 wt %.

Such a phenol composite resin is higher in glass transition temperature (Tg) than melamine resin, thus having stronger surface hardness.

The composite resin is excellent in shear strength, with low bending strength and good flexibility, and also can restrain heat-distortion, since flexible polyurethane resin is contained therein.

Further, the phenol composite resin absorbs less water than aqueous melamine, attributable to aromatic resorcinol which is an oily component.

Therefore, the inventive floor-covering material, in which the transparent protective layer 1 and the shaping layer 2, together forming the surface layer, are incorporated to a phenol composite resin, has advantages in terms of low absorption, no moisture-distortion, low heat contraction and expansion, and no generation of curling due to heat.

Figure 1:
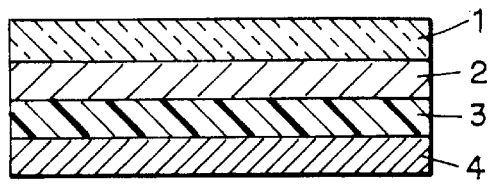
FIG. 1 is a cross-sectional view of the floor-covering material according to the primary embodiment of the present invention.
Figure 2:
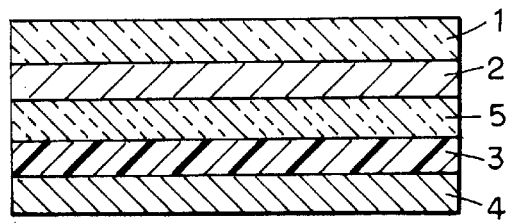
FIG. 2 is a cross-sectional view of the floor-covering material according to another embodiment of the present invention.
Figure 3:
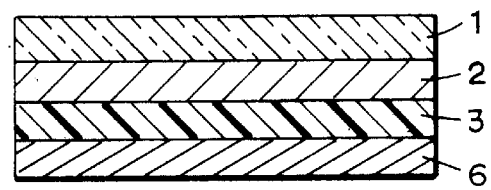
FIG. 3 is a further cross-sectional view of the floor-covering material according to a further embodiment of the present invention.
Figure 4:
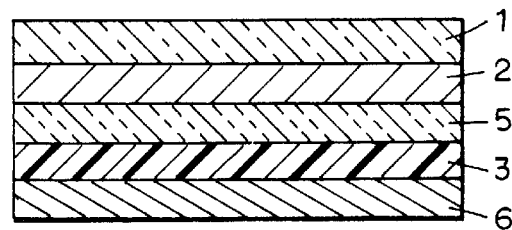
FIG. 4 is a further cross-sectional view of the floor-covering material according to still another embodiment of the present invention.

As can be seen in FIG. 1, the shaping layer 2 and the transparent protective layer 1, in order, are laminated on the top side of a base layer comprising a PVC base or waterproof plywood 3, and, onto the opposite side thereof, a backing sheet layer 4 is thermally compressed. As in FIG. 2 similar to FIG. 1, a glass fiber layer (G/F layer) 5 may be sandwiched between the base layer and the shaping layer 2. Also, as in FIG. 3 similar to FIG. 1, a veneer layer 6 may be laminated onto the bottom side of the base layer. As in FIG. 4 similar to FIG. 3, the glass fiber layer (G/F layer) 5 may be inserted between the waterproof plywood layer 3 and the shaping layer 2.

Insertion of the glass fiber layer (G/F layer) 5 results in an improvement in heat insulation and sound insulation.

As for the transparent protective layer 1 of the present invention, a paper is impregnated with phenol composite resin of liquid phase and dried, to obtain the prepreg, which is then thermally compressed. Such a layer provides to the surface enhanced physical properties, such as contamination resistance, scratch resistance, impact resistance and chemical resistance, and dimensional distortion, while protecting the shaping layer 2.

Particularly, when a paper mixed with high abrasion resistant particles is used, hardness of the transparent protective layer 1 is further increased.

The above shaping layer 2 is obtained in the same manner as in the preparation of the transparent protective layer 1, by incorporating a shape-printed paper with phenol composite resin of liquid phase and drying it, to obtain the prepreg, which is thermally compressed. This layer provides variously patterned shapes of natural texture in appearance.

In the present invention, when highly abrasion-resistant ceramic is added to the phenol composite resin, surface hardness of the transparent protective layer 1 can be further increased.

Meanwhile, the upper sheet layer, composed of the transparent protective layer 1 and the shaping layer 2, is 0.05–0.40 mm thick, and the PVC base or the waterproof plywood layer 3 has a thickness of 5–12 mm. The backing sheet layer 4 or the veneer layer 6 is about 0.10–0.60 mm thick. Accordingly, it is preferred that a laminated structure having a total thickness of 6–13 mm is formed.

The PVC base layer 3, which contains at least one (10–20 wt %) selected from among elvan, jade and loess, makes excellent health flooring that highly radiates far infrared rays. This base layer is prepared by use of 60–70 wt % of at least one filler selected from among calcium carbonate, talc and barium sulfate, having high specific gravity of 2.7–4.5, based on the total weight of vinyl chloride resin, and thus high in sound insulation and heat transfer rate. Hence, this layer is suitable for use in flooring materials for the Korean under-floor heating system.

The backing sheet layer 4 of PVC sheeting (0.10–0.60 mm) contains 50–80 wt % of a filler, and increases adhesion upon construction, with no heat-distortion.

The veneer layer 6 is composed of a single layer of thin wood plate. This wood plate plays a role in absorption of gas escaped from cracks of the floor of the above under-floor heating system. So, this layer prevents the floor surface from becoming convex due to the escape of gas.

As for the transparent protective layer 1 and the shaping layer 2, 100–300 wt % of transparent phenol composite resin is incorporated with paper, on the basis of the paper weight, and dried in a dry oven at 150° C. for 10 minutes, to obtain the prepreg, which is then thermally compressed.

In the flooring material of the present invention, the transparent protective layer 1, the shaping layer 2, the base layer (PVC base or waterproof plywood) 3 and the backing sheet layer 4 or the veneer layer 6, in order, are laminated and thermally compressed using a press.

The press compression process is performed by introducing each laminated sheet and waterproof plywood or PVC base 3 into an open press for thermal compression, and compressing them at a flat press temperature of 150–170° C. under pressure of 40–70 kg/cm² for 20–30 minutes.

The heated layers are cooled for 20–30 minutes, to minimize heat-distortion.

With a view to enhancing the appearance of products, the upper surface-hardening part of the press is patterned to be uneven, and glossy floor-covering materials provided with various patterns can be obtained.

The physical properties of the inventive- and conventional-floor-covering materials are given in Table 1, below.

TABLE 1

|  | Unit | Invent. Fl. Cov. Mat. (Floor) | Invent. Fl. Cov. Mat. (Under-Floor) | Reinforced Floor Sheet Mat. | PVC Fl. Cov. Mat. |
|---|---|---|---|---|---|
| Curling (W) | % | +0.05 | −0.15 | −0.18 | −0.75 |
| Heat Contraction (W) | % | −0.07 | −0.06 | −0.11 | −0.41 |
| Heat Contraction (L) | % | −0.10 | −0.12 | −0.13 | −0.50 |
| Abrasion Resistance | mg | 0.143 | 0.137 | 0.1565 | 0.556 |

Note:
W: width,
L: length

Abrasion Resistance Test
  Based on KSF-3111 (abrasion resistance test)
  Size of abrasion cycle: H-22 (total load: 500 g)
  Tested No.: 500 times Weight before abrasion–weight after abrasion=abrasion resistance (mg)

Curling & Heat Contraction
  A test piece of a size of 9 cm (width)×90 cm (length) was prepared.
  The test piece was allowed to stand in a dry oven at 80° C. for 6 hours, and then the size of the test piece was measured.
  Before and after drying, the differences between the changed widths and between the changed lengths were calculated to percentage (%).

As described above, the surface layer comprising the transparent protective layer 1 and the shaping layer 2 is prepared from phenol composite resin, and thus is low in dimensional distortion due to heat and moisture, and has further advantages of prevention of curling, and excellent scratch resistance and surface strength.

The floor-covering material of the present invention, containing the PVC base 3 as the base layer, is high in heat transfer rate and superior in sound insulation, so suitable for use in the under-floor heating system.

Since the balance layer is not necessarily attached to the bottom side of the inventive floor-covering material, different from typical floor-covering materials, a variety of layers may be attached to such a bottom side, according to preference.

Further, a core layer may be not contained in the flooring material of the present invention because of high strength and flexibility of the surface layer, and thus the inventive flooring material is advantageous in terms of simple structure and low preparation cost.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A floor-covering material using phenol composite resin, comprising a shaping layer and a transparent protective layer on the upper side of a PVC base or a waterproof plywood layer, the shaping layer and the transparent protective layer being formed by adding 15–25 wt % of polyurethane resin to phenol resin obtained from reaction of resorcinol and formaline, to form a phenol composite resin of liquid phase, which is incorporated with paper, yielding a prepreg, which is then thermally compressed.

2. The floor-covering material as set forth in claim 1, wherein the PVC base contains 10–20 wt % of any one selected from among elvan, jade and loess, and is prepared using 60–70 wt % of a filler selected from among calcium carbonate, talc and barium sulfate, on the basis of the total weight of vinyl chloride resin.

3. The floor-covering material as set forth in claim 1, wherein, to a bottom side of the PVC base or the waterproof plywood layer, either one of a backing sheet layer or a veneer layer is attached.

4. The floor-covering material as set forth in claim 3, wherein the backing sheet layer is a PVC sheet containing 50–80 wt % of a filler.

5. The floor-covering material as set forth in claim 1, wherein a glass fiber layer (G/F layer) is laminated onto the bottom side of the shaping layer.

* * * * *